United States Patent [19]

Kilian et al.

[11] 4,017,845
[45] Apr. 12, 1977

[54] CIRCUITRY FOR SIMULTANEOUS TRANSMISSION OF SIGNALS AND POWER

[75] Inventors: Thomas M. Kilian, Blaine; Mark D. Ryan, Fridley, both of Minn.

[73] Assignee: FMC Corporation, San Jose, Calif.

[22] Filed: June 16, 1975

[21] Appl. No.: 587,525

[52] U.S. Cl. .............................. 340/310 R; 333/1; 333/96; 307/2; 307/26
[51] Int. Cl.² ...................................... H04M 11/04
[58] Field of Search ..... 340/310 R, 310 A, 310 CP, 340/210; 333/97 R, 10, 1, 96; 174/115, 36; 325/308, 379, 385; 307/149, 2, 26

[56] References Cited

UNITED STATES PATENTS

| | | | |
|---|---|---|---|
| 3,311,831 | 3/1967 | Leppert | 325/308 |
| 3,324,417 | 6/1967 | Garner | 333/96 |
| 3,641,536 | 2/1972 | Prosprich | 340/310 R |
| 3,697,896 | 10/1972 | Sarkozi | 333/96 |
| 3,706,040 | 12/1972 | Gargini | 325/308 |

Primary Examiner—John W. Caldwell
Assistant Examiner—James J. Groody
Attorney, Agent, or Firm—R. S. Kelly; L. B. Guernsey; C. E. Tripp

[57] ABSTRACT

A transmission line having a pair of wires enclosed in a shield is used to simultaneously transmit high frequency signals and low frequency power between distant locations. At the sending end of the line a high frequency source is connected between the first and second wires by circuitry which prevents the low frequency power from being coupled into the high frequency source. A low frequency power supply is connected between the shield and both of the wires by circuitry which prevents the high frequency signals from being coupled into the low frequency supply. At the receiving end of the transmission line circuitry is provided which separates the high frequency signals from the low frequency power.

8 Claims, 1 Drawing Figure

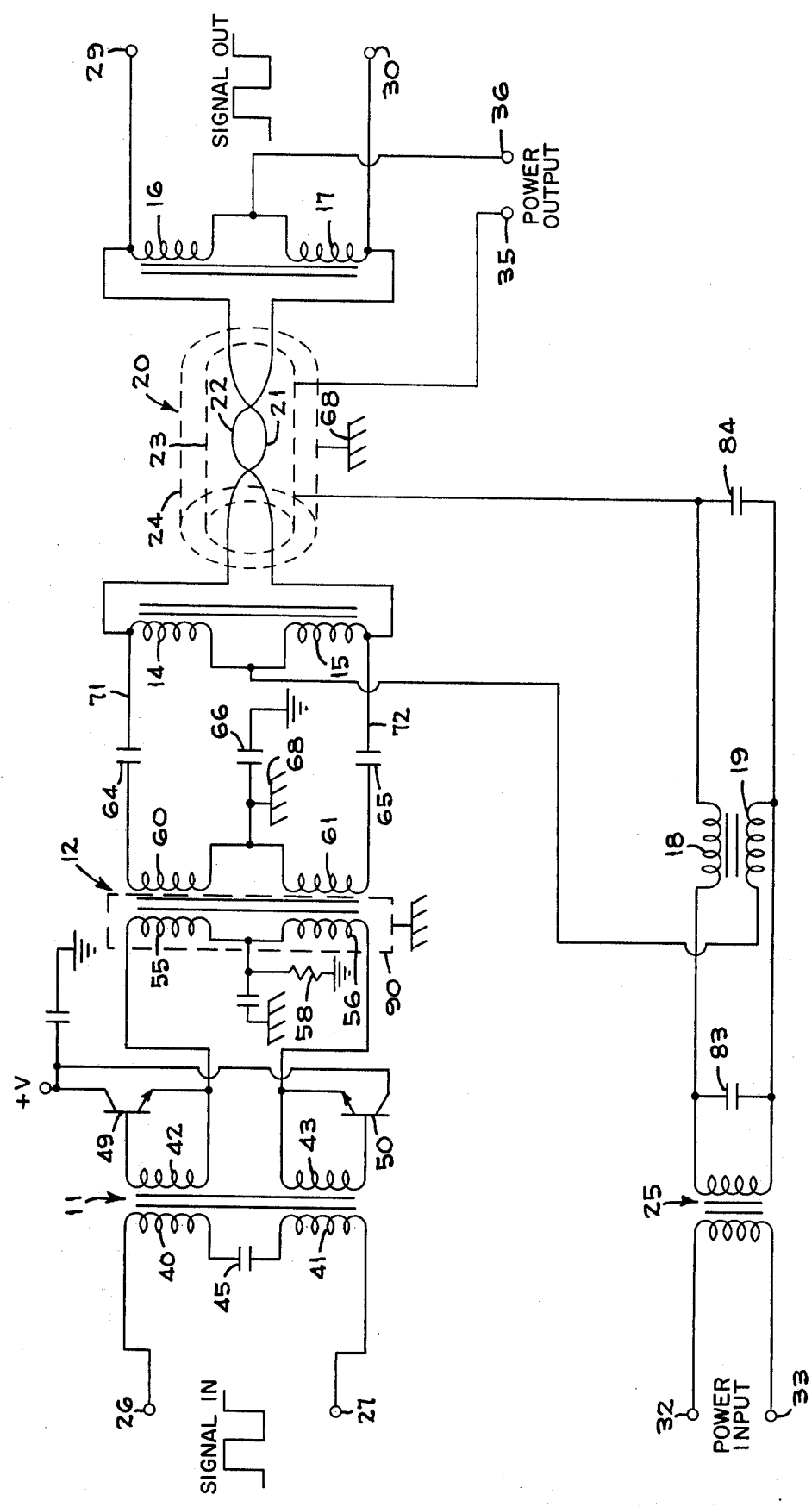

CIRCUIT FOR SIMULTANEOUS TRANSMISSION OF SIGNALS AND POWER

BACKGROUND OF THE INVENTION

1. Field of the Invention

The present invention pertains to transmission lines, and more particularly, it pertains to transmission line circuitry which is used to simultaneously conduct both high frequency signals and low frequency power.

2. Description of the Prior Art

In many communication systems information gathered at one location in the system and transferred to another location requires that power to operate equipment at the second location must be also transferred between the same two locations. In most of these prior art systems one set of wires or cables is used to carry the information between locations and another set of wires or cables is used to carry the power required. This dual set of cables causes the system to be relatively bulky and expensive. There have been attempts to combine the information signal system and the power distribution system into a single system by transmitting information signals which include relatively large values of voltage and current. At the receiving end of the communication system these information signals are used to provide information and also to provide limited amounts of power to operate equipment which may be used at the receiving end of the transmission line. However, the generators and amplifiers required to develop and transmit these power information signals are expensive so that such a system is not practical for anything except low power applications using relatively short lengths of transmission lines.

SUMMARY OF THE INVENTION

The present invention comprises a system for transmitting separate information signals and AC power over a single coaxial cable having a pair of wires enclosed in a shield. The information signals are transmitted on the pair of wires while the AC power is transmitted on the shield and the wires inside the shield.

The circuitry of the present invention overcomes the problem of requiring more than one set of wires or cables for coupling high frequency signals and low frequency power between distant locations. A single coaxial cable having a twisted pair of shielded wires is used to simultaneously transmit high frequency signals and low frequency power between distant locations. The high frequency signals are applied between the two shielded wires in a differential mode so that the signals are transferred from one end of the coaxial cable to the other end. The low frequency power is applied between the shield and both of the wires in a common mode and is transmitted from one end of the coaxial cable to the other as a common mode signal.

DESCRIPTION OF THE DRAWING

The FIGURE shown in a schematic drawing of the preferred embodiment of the present invention.

DESCRIPTION OF THE PREFERRED EMBODIMENT

Referring more particularly to the drawing the FIGURE shows circuitry for simultaneous transmission of high frequency signals and low frequency power between distant locations over a coaxial cable or transmission line 20 which includes a pair of shielded wires 21 and 22. The wires 21 and 22 are twisted about each other throughout the length of the cable. The high frequency signals are transferred between a pair of signal input terminals 26 and 27 and a pair of signal output terminals 29 and 30. The power is simultaneously transferred between a pair of power input terminals 32 and 33 and a pair of power output terminals 35 and 36.

A pair of high frequency transformers 11 and 12 couple the high frequency signals from input terminals 26 and 27 to the input leads of a coaxial cable 20 but prevent the low frequency power from being coupled back to the input terminals 26 and 27. Each of a pair of primary windings 40 and 41 and each of a pair of secondary windings 42 and 43 of transformer 11 include only a few turns so that the low frequency power will not be coupled to the signal input terminals through transformer 11. The few turns of each winding provide good coupling between the primary windings and the secondary windings for the high frequency signals which are applied to the signal input terminals 26 and 27 but attenuate any low frequency signals which may be coupled to the transformer. The high frequency response of the transformers 11 and 12 may be improved by using special low-loss wire in the primary and secondary windings. This low-loss wire can be damaged by excessive current in the wire. A source of high frequency signals which may be connected to input terminals 26 and 27 could cause a DC potential to develop between these input terminals. A capacitor 45 is connected between primary windings 40 and 41 to prevent DC current from flowing in these windings and thus protects the wire from excessive currents. Transformer 12 is also constructed with only a few turns on each of the primary and secondary windings in a manner generally similar to transformer 11.

A push-pull amplifier which includes a pair of transistors 49 and 50 is used to amplify the signal current from signal input terminals 26 and 27. The signals which are amplified by transistors 49 and 50 develop across a pair of primary windings 55 and 56 of transformer 12. Positive signals at input terminal 26 are coupled through transformer 11 to the base of transistor 49 thereby rendering transistor 49 conductive. When transistor 49 is conductive a current flows from the voltage source +V through transistor 49 and through primary winding 55 and a resistor 58 to ground. At this same time a negative signal is coupled through transformer 11 to the base of transistor 50 rendering transistor 50 nonconductive. When the polarity of the signal on the input terminals 26 and 27 is reversed and a low value of signal is applied to input terminal 26 the signal causes transistor 49 to be rendered nonconductive and causes transistor 50 to be conductive; thus, current flows through transistor 50, winding 56 and resistor 58 to the circuit ground. The resistor 58 limits current through the transistors 49 and 50 to prevent possible damage to these transistors.

One end of each of a pair of secondary windings 60 and 61 of transformer 12 is connected to a chassis ground 68 and connected to the circuit ground through a capacitor 66, the chassis ground being the connection for every metallic enclosure or other exposed conductor with which the operating personnel may come in contact. This ground connection between the two secondary windings provides a balanced signal to ground between the outer end of the secondary winding 60 and the outer end of secondary winding 61. In addition, a shield 90 is connected between the primary windings 55 and 56 of transformer 12 and the secondary windings 60 and 61 to reduce the capacitive coupling of common mode signals to the leads connected to the sending end of the coaxial cable 20. Without the ground connections and without the shield 90 high frequency signals could develop between the pair of wires 21 and 22 and the shield 23 of the coaxial cable 20. These high frequency signals could then produce noise voltages in the low frequency power. The noise voltages in the low frequency power may, in turn, introduce errors into the information signals at various locations in the system.

The low frequency power is applied to a pair of input terminals 32 and 33 and coupled through a transformer 25 and a pair of inductors 18 and 19 to the coaxial cable 20. This power frequency, for example, may be 400 Hz while the high frequency signal may be at 10 MHz. The 400 Hz low frequency voltage is coupled through the high frequency inductors 18 and 19 to the shield 23 and to the pair of wires 21 and 22 so that a common mode voltage of 400 Hz is developed between the pair of wires and the shield 23 of the coaxial cable 20. The inductors 18 and 19 provide a low impedance to the low power frequency but provide a high impedance to any high frequency signals which might be developed on the input leads of the transmission line. The high impedance of inductors 18 and 19 prevent the high frequency signals from being coupled back into the low frequency source connected to input terminals 32 and 33. Any high frequency signals in the power input leads wll also be attenuated by a pair of filter capacitors 83 and 84 which are connected directly across the power input leads. The twisted wires 21 and 22 and shield 23 of the transmission line 20 are enclosed in an armor 24 which protects the current carrying portions of the cable from damage. This armor which is directly connected to the chassis ground 68, also prevents personnel who may be near the cable from touching the shield 23 which transmits the AC power.

If a relatively large value of voltage from the low frequency power supply were coupled to the switching transistors 49 and 50 of the signal input these transistors could be damaged. To prevent such damage a pair of capacitors 64 and 65 are used to provide a high impedance between the low frequency power supply and the switching transistors. A pair of inductors 14 and 15 provide a low impedance at the low frequency so that the low frequency source is effectively connected to leads 71 and 72 in a parallel circuit and common mode arrangement; such inductors, however, provide a high impedance between the input leads 71 and 72 for the high frequency signal. Thus, the high frequency signal develops between wires 21 and 22 of the transmission line, while the low frequency power develops between the shield 23 and wires 21 and 22 in parallel.

At the output end of the coaxial cable 20 the pair of wires 21 and 22 are connected to a pair of inductors 16 and 17 which are connected in series between the output terminals 29 and 30. Inductors 16 and 17 provide a high impedance to the high frequency signal so that the high frequency signal develops across the high impedance between signal output terminals 29 and 30. On the other hand, the wires 21 and 22 of transmission line 20 are effectively connected in parallel to the low frequency power output terminal 36 of the low frequency supply. The shield 23 is directly connected to the other power output terminal 35.

From the foregoing description it can be seen that the circuitry of the present invention will transmit both the high frequency information signals and the low frequency power supply over a generally conventional transmission line having but a single pair of current carrying wires. The high frequency signals are transmitted in a differential mode by the pair of wires while the low frequency power is transmitted in a common mode by the shield and the pair of wires. The circuitry disclosed couples the low frequency power to the pair of wires and the shield and prevents any high frequency signals from being coupled back to the low frequency supply. The circuitry also differentially couples the high frequency signals to the pair of wires and prevents the low frequency power from being coupled into the high frequency source.

Although the best mode contemplated for carrying out the present invention has been herein shown and described, it will be apparent that modification and variation may be made without departing from what is regarded to be the subject matter of the invention.

What is claimed is:

1. Circuitry for simultaneous transmission of high frequency signals and low frequency power between distant locations for use with a source of high frequency signals and a low frequency power supply, said circuitry comprising: a transmission line having a twisted pair of wires and a shield enclosing said wires; means for coupling said source of high frequency signals to said pair of wires in a differential mode; means for coupling said low frequency power supply to said shield and to said wires; said means for coupling said source of high frequency signals to said wires including means for preventing said low frequency power from being coupled to said source of high frequency signals and means for preventing said high frequency signals from being coupled to said low frequency power supply.

2. Circuitry for simultaneous transmission of high frequency signals and low frequency power between distant locations for use with a source of high frequency signals connected to a pair of signal input terminals and a low frequency power source connected to a pair of power input terminals, said circuitry comprising: a transmission line having a twisted pair of wires and a shield enclosing said wires; means for coupling each of said signal input terminals to a corresponding one of said wires at a first end of said transmission line; means for connecting one of said power input terminals to said wires at a first end of said transmission line and, means for connecting the other of said power input terminals to said shield at said first end of said transmission line; said means for coupling said signal input terminals to a corresponding one of said wires each includes means for preventing said low frequency power from being coupled to said signal input terminals, said means for connecting power input terminals to said wires and to said shield including means for preventing said high frequency signals from being coupled to said power input terminals.

3. Circuitry for simultaneous transmission of high frequency signals and low frequency power as defined in claim 2 including: means for decoupling said high frequency signals from said wires at a second end of said transmission line and means for separately decoupling said low frequency power from said wires and said shield at said second end of said transmission line.

4. Circuitry for simultaneous transmission of high frequency signals and low frequency power between distant points, for use with a source of high frequency signals having a pair of output leads and a low frequency power supply, said circuitry comprising: a transmission line having a twisted pair of wires and a shield enclosing said wires; means for connecting said power supply between said shield and each of said wires at a first end of said transmission line; means for connecting one of said output leads from said source of high frequency signals to a first one of said wires; means for connecting the other of said output leads to a second one of said wires at said first end of said transmission line, said means for connecting said source of high frequency signals to said first wire and to said second wire each including means for preventing said low frequency power from being coupled to said source of high frequency signals; a pair of power output terminals, one of said power output terminals being connected to said shield at a second end of said transmission line; and means for coupling the other of said power output terminals to each of said wires at said second end of said transmission line so that said high frequency signals are available between said first and said second wires at said second end of said transmission line.

5. Circuitry for simultaneous transmission of high frequency signals and low frequency power as defined in claim 4 wherein said means for connecting said power supply between said shield and each of said wires includes means for preventing said high frequency signals from being coupled to said low frequency power supply.

6. Circuitry for simultaneous transmission of high frequency signals and low frequency power as defined in claim 4 wherein said means for connecting said power supply between said shield and each of said wires includes means for isolating said power supply from said high frequency signals and wherein said means for connecting said one output lead of said source of high frequency signals to said first wire and said means for connecting said other output lead of said source to said second wire each includes means for isolating said source of high frequency signals from said low frequency power.

7. Circuitry for simultaneous transmission of high frequency signals and low frequency power as defined in claim 6 wherein one of the leads of said power supply is connected to one end of a pair of inductors having a low impedance at said low frequency and a high impedance at said high frequency, the other end of each of said inductors being connected to one of said wires and to one of the leads of said source of high frequency signals.

8. Circuitry for simultaneous transmission of high frequency signals and low frequency power between distant locations, for use with a source of high frequency signals having a pair of output leads and a low frequency power supply, said circuitry comprising: a transmission line having a twisted pair of wires and a shield enclosing said wires; capacitive means for connecting each of said output leads of said source of high frequency signals to a corresponding one of said wires at a first end of said transmission line: inductive means for connecting said power supply between said shield and each of said wires at said first end of said transmission line; a pair of signal output terminals, each of said signal output terminals being connected to a corresponding one of said wires at a second end of said transmission line; a pair of power output terminals, one of said power output terminals being connected to said shield at said second end of said transmission line; and inductive means for connecting the other power output terminal to each of said wires at said second end of said transmission line so that said high frequency signals are available between said first and said second signal terminals at said second end of said transmission lines.

* * * * *

UNITED STATES PATENT OFFICE
CERTIFICATE OF CORRECTION

Patent No. 4,017,845           Dated  April 12, 1977

Inventor(s) Thomas M. Kilian, Mark D. Ryan

It is certified that error appears in the above-identified patent and that said Letters Patent are hereby corrected as shown below:

Column 3, line 32, "wll" should be --will--.

Column 6, line 11, after "end" insert --of each--.

Signed and Sealed this

Sixth Day of November 1979

[SEAL]

Attest:

RUTH C. MASON
Attesting Officer

LUTRELLE F. PARKER
Acting Commissioner of Patents and Trademarks